June 30, 1931.  W. GARDELLA  1,812,648

FILTER DISCHARGING MECHANISM

Filed Jan. 3, 1929

INVENTOR
WILLIAM GARDELLA
BY
ATTORNEY

Patented June 30, 1931

1,812,648

UNITED STATES PATENT OFFICE

WILLIAM GARDELLA, OF FLUSHING, LONG ISLAND, NEW YORK, ASSIGNOR TO OLIVER UNITED FILTERS INCORPORATED, OF SAN FRANCISCO, CALIFORNIA, A CORPORATION OF NEVADA

FILTER DISCHARGING MECHANISM

Application filed January 3, 1929. Serial No. 329,971.

This invention relates in general to filters of the continuous type and while I have illustarted my invention as applied to continuous filters of the drum type, it is obviously applicable to other filters having a screen of either cloth or woven or perforated metal upon which the filter cake is deposited during one portion of its revolution and removed during another portion.

It is an object of this invention to provide a discharger involving a new method of operation for removing the filter cake from the filter medium or screen upon which it has been deposited, which discharger will be more efficient in operation, readily renewed or replaced, more durable and which will materially reduce the normal discharger wear on the filter medium.

A further object of this invention is to provide a reversely driven discharger roll for removing the filter cake from a continuous filter which is spaced away from the surface of the filter medium and which will effectively remove the filter cake without material wear on either the filter medium or the discharge roller.

It is a further object of this invention to provide a smooth surface roll reversely driven with respect to the surface of a continuous filter which is adapted to ball up and remove the filter cake on the surface of the filter without actually contacting with the filter surface.

It is a still further object of this invention to disclose a method for removing filter cake from the surface of a continuous filter comprising a reversely driven smooth surface discharger roll spaced from the filter surface.

A further object of the invention is to provide an efficient discharge mechanism for continuous filters which will be of low original cost and have a low upkeep cost.

Further objects and advantages of this invention will appear from the following description thereof, taken in conjunction with the attached drawings illustrating preferred forms of embodiment of the invention and in which.

Figure 1:
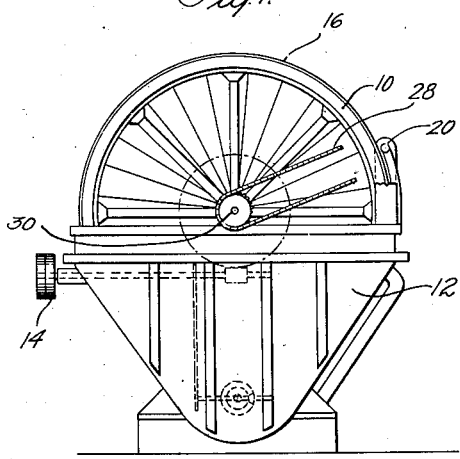
Figure 1 is an end elevation of a continuous drum filter.
Figure 2:
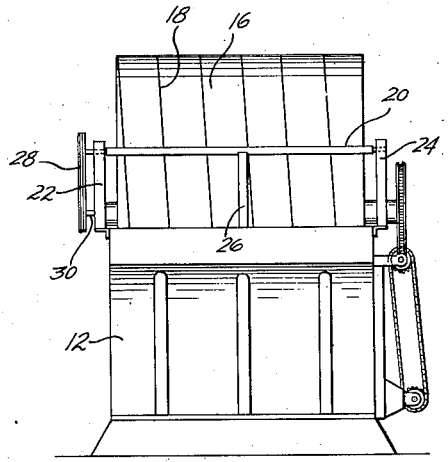
Figure 2 is a side elevation of the continuous filter shown in Figure 1.

In the apparatus heretofore used for discharging the filter cake from the filter screen, various types of adhesion rollers have been used whereby the adhesion of the cake to the roller was greater than the adhesion of the cake to the filter medium. Such a construction is clearly shown in the patent to Genter, No. 1,649,581, and will satisfactorily operate for particularly sticky cakes or slimes but in a large number of cases the adhesion roller rotating with the filter surface does not satisfactorily remove the cake.

In some cases, it has been found that the relative adhesion to the discharger roll and to the filter surface is so nearly the same that such rolls are not effective to bring about a complete and satisfactory discharge of filter pulp. Furthermore, with the continuous filter of the drum type, such as is disclosed herein and which is usually wound with a wire in a spiral formation to retain the filter medium close to the supporting structure, the adhesive roller is undesirable and objectionable and causes considerable wear.

The use of positively driven brushes or other wiping mechanisms are also undesirable because of the considerable wear both on the brushes and on the filter medium. Furthermore, the brushes tend to break up the filter cake rather than discharge the cake in a continuous sheet as the present structure will do.

I have herein illustrated a continuous filter of the drum type comprising the drum 10 which rotates in the filter tank 12 by the well known operation of the driving mechanism 14. The surface of the drum 10 is provided with a filtering medium 16 on which a cake is formed during the rotation of the filter drum through the filter tank 12 by the vacuum communicated to the filter segments through the center shaft 30 and it is essential that this filter cake be removed completely in each cycle of operation. The great expanse of filter medium 16 usually requires a suitable wire winding 18 for support as is the well known construction of the drum type of filter shown in the patent to E. L. Oliver, No. 919,628, dated April 27, 1909.

In order to remove the filter cake, which forms during the periodic rotation of the filter drum, I provide a discharger roll 20 supported on the ends by the bearings 22 and 24 and centrally by the bearing 26. This roll is positively driven by a chain or other driving means 28 from the central shaft 30 in the same direction as the drum itself is driven which brings about a peripheral rotation opposite to that of the periphery of the drum at the point of nearest approach as indicated by the arrows in Figures 3 and 4.

Figure 3:
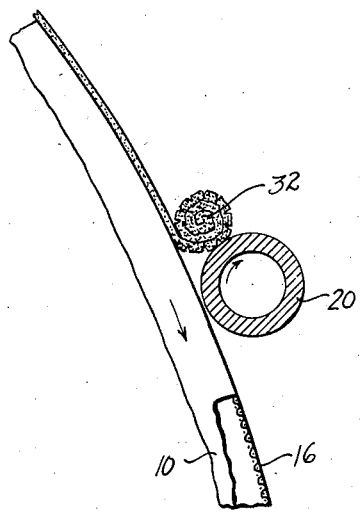
Figure 3 is a diagrammatic view of the filter drum and the discharger roll showing the preliminary balling up of the filter cake.
Figure 4:
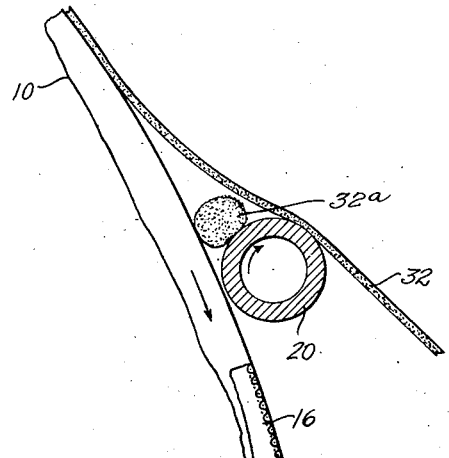
Figure 4 is a similar diagrammatic view to Figure 3 showing the advanced position in which the filter cake is continuously removed over the discharger roll.

The discharger roll 20 is spaced from the filter medium 16 and the wires 18 thereon, as is more particularly shown in Figures 3 and 4, and does not actually contact with either the filter medium or the wire winding. Under such circumstances, there is no appreciable wear on either the filter medium 16 or the wires 18 or the roller 20 at which point the suction on the filter surface is cut off due to the discharge of the filter cake.

As the filter rotates through its cycle of suction, during which period the filter cake is built up on the periphery of the drum and subsequently is dried, the filter cake reaches the position as shown in Figure 3 adjacent the discharger roll 20. As the discharger roll is revolving on the periphery opposite the peripheral direction of the drum, and preferably at a slightly higher surface speed than the speed of the drum 10, the filter cake is rolled backward into a ball or roll, as shown at 32, until it reaches such a condition that the ball 32a is higher than the discharger roll 20 whereupon it will continue in the direction of the discharger roll 20 until it will pass over the top of the discharger roll and will then drop by gravity into the position, as shown in Figure 4. After the first cake has started and reached the position as shown in Figure 4, it will be found that the filter cake will continuously pass over the periphery of the discharger roll 20 and may be dropped into any suitable receptacle or conveyed to a desired point. In case of stoppage of the filter or if the cake should break, the balling action, as shown in Figure 3, will take place again until the cake is of such size as to pass over the periphery of the discharger roll.

In practice, it has been found that a smooth surface brass roll, approximately three inches in diameter, is most desirable for a drum eight feet in diameter on which a filter cake of paper pulp is built up. It is necessary that the discharger roll 20 be located as much below the top of the filter as possible and spaced clear but not distant from the surface inasmuch as the tendency of the filter cake to pass over the periphery of the discharger roll is greatly augmented by the force of gravity. It is obvious that if the discharger roll were placed near the top of the drum, some external means would be necessary to force the cake over the discharger roll, whereas in the position as shown in Figure 1 the cake will tend more readily to follow and pass over the discharger roll.

The operation of this device can easily be distinguished from the operation of the previous devices which required a high coefficient of adhesion to force the filter cake to leave the filter medium and follow the contour of the discharge means. In the present case, the roll by rotating in an opposite peripheral direction to the drum will necessarily cause a balling up of the filter cake and when the cake reaches such proportions as to pass over the top of the discharger roll, the cake will then be removed in a substantially continuous sheet.

The discharger roll 20 is of such small diameter with respect to the length of the drum that a central bearing 26 is usually desirable. The central bearing, however, may have reasonable freedom in a movement in a direction parallel to the horizontal axis of the filter, so that it may follow such irregularities in the filter surface as will appear. Where the conditions of filter operation are such as to form a crowned or depressed filter cake in the center of the drum, the discharger roll 20 will operate equally well.

The material from which the discharger roll 20 may be made will vary somewhat under the circumstances and under the conditions of operation and will depend also on the nature of the material to be filtered. It has been found that a smooth brass roll is particularly desirable for discharging paper pulp and felt or rubber covered rolls are particularly desirable for other materials. It is also obvious that any smooth metal or wood or stone or fabric roll may be used without changing from the broad method of operation or a corrugated iron roll having a rubber cover could be used under certain conditions.

The principal features therefore of my invention are that a reversely rotating discharger roll, spaced from the filter surface, is used, that it operates by balling up the filter cake, forming a ball of such a size that it will pass over the surface of the discharger roll to start the continuous discharge which will continue aided by gravity, so that the filter cake will finally be discharged in a continuous sheet. The speed of rotation of the discharger roll will be the same peripheral speed as the surface of the drum, so that after the cake is started and is being removed in a continuous sheet, the discharger roll will draw the cake directly from the surface of the drum rather than permitting it to ball up subsequent to the initial start. No blow back is necessary as the cake will come off by the contact with the reversely rotating roll. A further feature is that the discharger roll is spaced slightly from and does not come in contact with the filter medium in itself and will not cause any wear on the filter medium. As the filter drum and the discharger roll are free to rotate, the wear on the apparatus is materially reduced. The discharger roll must be of a relatively small diameter being approximately one thirty-second the size of the filter drum and will extend throughout the length of the filter medium, being supported centrally, if necessary, to maintain the alignment. It will also be located materially below the top of the drum so that the force of gravity will aid the roll in removing the filter cake.

While I have shown preferred forms of embodiment of my invention, I am aware that various other modifications might be made therein and I, therefore, desire a broad interpretation of the device within the scope and spirit of the disclosure and within the scope and spirit of the appended claims.

I claim:

1. In combination with a continuous rotating drum filter having a filter medium on the cylindrical surface thereof and adapted to have a filter cake built up thereon, a smooth metal discharger roll, said discharger roll being spaced a slight distance from the filter medium and being located below the top of said drum and nearer the horizontal axis thereof than the vertical axis on the cake discharge side of said filter, end bearings supporting said roll, said roll rotating so that the surface nearest the filter drum moves in a direction opposite to the movement of the drum to ball up the cake adjacent the point of discharge to such an extent that the balled-up cake passes over the top of the roll and falls by gravity and thereafter discharges in a substantially continuous sheet.

2. The combination in a rotary drum continuous filter of a discharge roller, comprising a smooth metallic cylinder spaced from the filtering surface of said drum, and means to rotate said roller so that the surface nearest the drum moves in a direction opposite to the rotation of said drum to strip the filter cake from said drum without wear on said filter surface.

3. The combination in a rotary drum continuous filter having a woven filter medium of a filter cake discharger comprising a cylinder spaced from the filtering medium of said drum and not contacting therewith, means to rotate said cylinder so that the surface nearest the drum moves in a direction opposite to the rotation of said drum to strip the filter cake from said drum without touching the filter medium and without wear on said filter medium.

4. The combination in a rotary continuous filter having a woven filter medium of a filter cake discharger comprising a roller spaced from the filtering medium of said filter and not contacting therewith, means to rotate said roller so that the surface nearest the filtering surface moves in a direction opposite to the rotation of said filter to strip the filter cake from said filter without touching the filter medium and without wear on said filter medium.

In testimony whereof I have affixed my signature to this specification.

WILLIAM GARDELLA.